(12) United States Patent
Ubara et al.

(10) Patent No.: US 6,689,437 B1
(45) Date of Patent: Feb. 10, 2004

(54) OXYGEN-ABSORBING MATERIAL

(75) Inventors: Hisashi Ubara, Otsu (JP); Tetsuo Kodama, Otsu (JP); Naoki Mizuno, Turuga (JP); Yoshimitsu Sakaguchi, Otsu (JP); Ken Takasugi, Otsu (JP); Syunji Kurahara, Otsu (JP); Koichi Matsuda, Turuga (JP); Shoichi Gyobu, Otsu (JP); Yusuke Shimizu, Otsu (JP); Hidekazu Yoshida, Osaka (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 0 days.

(21) Appl. No.: 09/937,656

(22) PCT Filed: Mar. 30, 2000

(86) PCT No.: PCT/JP00/02057
§ 371 (c)(1),
(2), (4) Date: Dec. 18, 2001

(87) PCT Pub. No.: WO00/58404
PCT Pub. Date: Oct. 5, 2000

(30) Foreign Application Priority Data

Mar. 31, 1999 (JP) .............................................. 11-92452
Dec. 27, 1999 (JP) ........................................... 11-370561
Mar. 14, 2000 (JP) ......................................... 2000-70434

(51) Int. Cl.⁷ ......................... B29C 49/88; C08G 69/00; C08K 5/00
(52) U.S. Cl. ............................... 428/35.7; 252/188.28; 428/35.1; 428/35.5
(58) Field of Search .............................. 428/35.7, 35.1, 428/35.5; 252/188.28

(56) References Cited

U.S. PATENT DOCUMENTS

| | | | |
|---|---|---|---|
| 5,498,364 A | * 3/1996 | Speer et al. | ........... 252/188.28 |
| 5,627,239 A | * 5/1997 | Ching et al. | ............. 525/330.6 |

FOREIGN PATENT DOCUMENTS

| | | |
|---|---|---|
| EP | 0 380 319 | 8/1990 |
| EP | 0 839 862 | 5/1998 |
| JP | 2-500846 | 3/1990 |
| JP | 3-762 | 1/1991 |
| JP | 4-45152 | 2/1992 |
| WO | WO 89/01012 | 2/1989 |

* cited by examiner

*Primary Examiner*—Sandra M. Nolan
(74) *Attorney, Agent, or Firm*—Leydig, Voit & Mayer, Ltd.

(57) ABSTRACT

An oxygen-absorbing material including a transition metal compound and one or more thermoplastic resins, when used for a molded product such as container, exhibits excellent gas-barrier and oxygen-absorbing properties. The material absorbs oxygen from contents and blocks oxygen from entering so that the contents can be maintained in an oxygen-free state for a long period of time. An excellent oxygen-absorbing property is achieved by an amino group content of 20 mmol/kg or lower in at least one thermoplastic resin and by lowering the crystallinity of the thermoplastic resin.

18 Claims, No Drawings

OXYGEN-ABSORBING MATERIAL

TECHNICAL FIELD

The present invention relates to oxygen-absorbing materials excellent in their oxygen-absorbing property and suitable for use in the form of powder, particles or film or for use as one component of a molded product such as a container. The present invention further relates to containers and molded products excellent in their gas barrier property that use the oxygen-absorbing materials therein. More specifically, the present invention relates to containers and molded products excellent in their gas barrier property and accordingly suitable for preserving food items/beverages or pharmaceutical drugs that are damaged by oxygen in terms of their taste, oxygen-sensitive substances and the like.

BACKGROUND ART

Thermoplastic polyester resin which includes polyethylene terephthalate as a major component has been used widely for packaging materials by being processed into various containers, films, sheets and the like, because of its superior dynamic properties, gas barrier property, chemical resistance, flavor-retaining property, hygienic properties and the like. However, even the thermoplastic polyester resin including the polyethylene terephthalate as a major component does not have absolutely perfect properties. Especially, the thermoplastic polyester resin is not suitable for containers of food items, beverages, cosmetics, pharmaceutical drugs and the like that are contents requiring a gas blocking property, since the thermoplastic polyester resin is particularly insufficient in a gas barrier property against oxygen. Accordingly, improvements have been made by blending the polyester resin including the polyethylene terephthalate as a major component with any gas barrier material having an excellent gas barrier property or layering them on each other to produce a laminate. However, the improvements are not appropriate for food items and beverages sensitive to oxygen. Moreover, National Patent Publication No. 2-500846 and Japanese Laying-Open No. 3-762 disclose techniques according to which molded products such as container, package and lid are produced by blending the polyester resin with MXD6 (condensation polymer of metaxylylene diamine and adipic acid) which is oxidizable polyamide resin and a Co compound which is oxidation catalyst, or by layering them on each other to produce a laminate. Although the techniques provide improvements to some degree, they are still inappropriate for food items, beverages, pharmaceutical drugs and cosmetics that are sensitive to oxygen.

SUMMARY OF THE INVENTION

One object of the present invention is to provide an oxygen-absorbing material superior in its ability to preserve food items, beer, soft drinks, cosmetics, drugs or the like that are sensitive to oxygen for a long period of time without damage, which has not been achieved by any prior art, and to provide a molded product such as packaging container with the gas barrier property using the oxygen-absorbing material therein.

DISCLOSURE OF THE INVENTION

According to the present invention achieving the object above, a packaging container or molded product having the gas barrier property can contain a composition structured by blending a non-oxidizable thermoplastic resin with at least one type of oxidizable polymer having an oxygen-capturing function and a metal catalyst catalyzing oxidation of the oxidizable polymer or layering them on each other to form a laminate.

Here, the oxidizable resin refers to a resin oxidized through an oxidization reaction in the presence of oxygen. Specifically, the oxidizable resin has a structural unit including a methylene group bonded to an aromatic ring, the methylene group being further bonded to an element other than hydrogen and carbon, for example. Examples of the element other than hydrogen and carbon are N, O, S and the like preferably having a xylylene diamine structure.

It is particularly important that the content of the blended or layered oxidizable resin to form the container is at least 1 wt % with respect to structural components and that a polyamide resin is used containing a basic group such as amino group of 20 mmol/kg or less. Examples of the metal catalyst are compounds of Fe, Mn and Co that are transition metals of the first period. These metal catalysts can be included in advance in the oxidizable resin before being molded. The present invention is described below in more detail together with functions thereof

DETAILED DESCRIPTION

The inventors of the present invention have found that an amino group contained in the oxidizable resin has an influence on the oxygen-capturing function of the oxidizable resin which is subjected to an oxidation reaction by the metal catalyst. The inventors have accordingly found a resin with the gas barrier property excellent in the oxygen-capturing ability, by controlling the amount of such functional groups within an appropriate range. According to findings of the inventors, the amount of the basic group such as amino group included in the oxidizable resin is 20 mmol/kg or less, preferably 15 mmol/kg, and more preferably 10 mmol/kg or less, so that an excellent oxygen-capturing ability is achieved with the help of the metal catalyst such as Co.

The oxidizable resin used for the present invention is preferably a polyamide and more preferably a polyamide resin containing a metaxylylene group. A particularly preferable polymer contains, in a molecular chain, at least 70 mol % of a structural unit formed of metaxylylene diamine or mixed xylylene diamine including metaxylylene diamine and paraxylylene diamine of 80% or less with respect to the entire amount and α, ω aliphatic dicarboxylic acid with the carbon number of 6–10. Examples of the polymer are homopolymers such as polymetaxylylene adipamide, polymetaxylylene sebacamide and polymetaxylylene superamide, copolymer of metaxylylene diamine/adipic acid/isophthalic acid, copolymer of metaxylylene/paraxylylene adipamide, copolymer of metaxylylene/paraxylylene piperamide, copolymer of metaxylylene/paraxylylene azelamide, and the like.

These polyamide resins containing the metaxylylene group are brittle in an amorphous state. Therefore, such resins are required to have a relative viscosity of preferably at least 1.5 and more preferably at least 2.0.

It is necessary that the amount of the amino group (AG) contained in the oxidizable polyamide is 20 mmol/kg or less. The amount of amino group can be adjusted by adding an excessive amount of dicarboxylic acid component to the diamine component in the process of polymerization, or by adding any sealing agent reacting with the amino group such as acid anhydride, monocarboxylic acid and the like when the polymerization process is completed, for example.

The amount of carboxyl end group contained in the polyamide resin is preferably at least 10 mmol/kg and more preferably at least 20 mmol/kg.

Preferably, the molar ratio of the carboxyl end group (CEG) and amino group (AG) contained in the polyamide resin, i.e., CEG/AG is at least 2, or at least 4, so that the oxygen capturing ability obtained by the metal catalyst such as Co can be enhanced.

According to the present invention, in addition to the oxidizable resin, a non-oxidizable thermoplastic resin is preferably used for forming a molded product such as container by blending or layering of them. Examples of the non-oxidizable thermoplastic resin are polyester resin, polyamide resin such as nylon 6 and nylon 66, polymer with a high nitrile content, copolymer of ethylene-vinyl alcohol, polycarbonate, polystyrene resin, and the like. The non-oxidizable thermoplastic polyester resin refers to a polyester usually containing at least 80 mol %, preferably at least 90 mol % of terephthalic acid in an acid component and containing at least 80 mol %, preferably at least 90 mol % of ethylene glycol in a glycol component. The remaining portion of the acid component includes for example isophthalic acid, diphenyl ether 4,4'-dicarboxylic acid, naphthalene 1,4- or 2,6-dicarboxylic acid, adipic acid, sebacic acid, decane 1,10-dicarboxylic acid, or hexahydroterephthalic acid. The remaining portion of the glycol component includes for example propylene glycol, 1,4-butanediol, neopentyl glycol, diethylene glycol, cyclohexane dimethanol, or polyethylene naphthalate, or copolymer thereof. The polyester resin further contains a hydroxy acid such as p-oxy benzoic acid. Alternatively, at least two types of polyesters may be blended so that the ethylene terephthalate is contained in the range as described above. The thermoplastic polyester resin according to the present invention has an intrinsic viscosity of preferably at least 0.55, and more preferably in the range from 0.65 to 1.4. The intrinsic viscosity less than 0.55 is not enough for a resultant molded product such as container to have a sufficient mechanical strength.

Specific examples of the non-oxidizable polyamide resin used for the present invention are thermoplastic polyamide resin such as polycapric amid (nylon 6), polyundecanamide (nylon 11), polylaurinlactam (nylon 12), polyhexamethylene adipamide (nylon 6, 6), polyhexamethylene sebacamide (nylon 6, 10), caprolactam/laurinlactam copolymer, and caprolactam/hexamethylene diammonium adipate copolymer, as well as blends of these homopolymers or copolymers, for example. These non-oxidizable polyamide resins have a relative viscosity of preferably at least 1.5, and more preferably at least 2.0. According to the present invention, the polymer with a high nitrile content employed as the non-oxidizable thermoplastic resin is a thermoplastic copolymer which contains 40 to 97 mol %, with respect to the entire polymer, of ethylene-based unsaturation monomer containing a nitrile group such as acrylonitrile, methacryl nitrile and mixture thereof, and contains, as a remaining copolymer component, 3 to 60 mol % of at least one or a combination of at least two types of monomer such as styrene, vinyltoluene, butadiene, isoprene, methyl methacrylate methyl acrylate, and methylvinylether. An example of the ethylene-vinyl alcohol copolymer used as the non-oxidizable thermoplastic resin according to the present invention is saponified copolymer of ethylene and vinylester such as vinyl formate, vinyl acetate and vinyl propionate, for example.

According to the present invention, if the molded product such as packaging container has a multilayer structure formed of laminate, a blend of the non-oxidizable thermoplastic resin and oxidizable resin may constitute one layer. Further, any additive such as coloring agent, ultraviolet absorber, antistatic agent, lubricant and the like may be contained in any appropriate layer with an appropriate content.

According to the present invention, preferable examples of the metal catalyst are compounds of transition metals of the first period (Fe, Mn, Co, Cu) and rhodium. Specifically, organic salt, chloride, phosphate, phosphite, hypophosphite, diphosphate, methaphosphate, sulfate, alkyl phosphate or phthalocyanine complex only, or mixture thereof is used. Examples of the organic salt are the salts of acetic acid, propionic acid, octanoic acid, lauric acid, and stearic acid that are salts of aliphatic alkyl acid of C2–C22, and the salts of malonic acid, succinic acid, adipic acid, sebacic acid, and hexahydro phthalic acid that are dibasic acid salts, the salts of butane tetra carboxylic acid, benzoic acid, toluic acid, o-phthalic acid, isophthalic acid, terephthalic acid and trimesic acid that are aromatic carboxylic acid salts, and the salts of polyacrylic acid and ethylene/acrylic acid copolymer that are macromolecular carboxylic acid salts, and they are used solely or as a mixture thereof.

A packaging container of the structure according to the present invention was produced and effects thereof were examined. As a result, it has been found that the container using the thermoplastic resin therein, which has not been achieved by prior arts, is appropriate as a molded product such as packaging containers of oxygen-sensitive food items and beverages.

The molded product here refers to products in the forms of cloth, nonwoven fabric, film, and sheet, and further to containers such as bag and hollow molded product, tray, and lid constituting a part of a container or bag.

The inventors of the present invention have closely studied the oxygen-absorbing ability to find that, in a polymetaxylylene adipate (MXD6), an oxidation reaction of the MXD6 of capturing oxygen molecules predominantly occurs in an amorphous portion thereof and the reaction proceeds considerably slowly in a crystalline portion thereof. One reason for this is considered that oxygen absorption occurs in the crystalline portion only at the surface and accordingly the oxygen is less likely to enter the inside, or, if the MXD6 is in a readily-crystallized state, the crystallization speedily occurs in a portion absorbing oxygen and thus the crystallized portion serves as a gas barrier layer preventing oxygen from entering, and consequently, oxygen is not absorbed efficiently.

According to this finding, a copolymer component which lessens the crystallinity of oxidizable resin represented by MXD6 is incorporated in the resin or the resin is blended with another resin in order to reduce the crystallinity of the oxidizable resin. In this way, a polymer material superior to conventional oxygen absorbers in the oxygen-absorbing ability can be obtained.

Further, the present invention is an oxygen-absorbing material formed of a resin composition including a resin component and a metal catalyst. The resin component includes an oxidizable resin which is at least one of a resin having a melting point of 230° C. or lower and a resin blend having a melting point of 230° C. or lower. The oxidizable resin is preferably a polyamide resin containing at least 50% by weight of a metaxylylene diamine adipate unit. The resin with the melting point lower than 230° C. may not clearly show that point, however, the melting point in this range is included in the scope of the present invention.

The melting point of MXD6 is usually at least 240° C. and formed mainly of a crystalline portion. However, an amorphous portion can be increased by copolymerization with another component or by blending with another resin. Crystallization of the amorphous portion in the MXD6 can be prevented to obtain a stable oxygen-absorbing ability.

The melting point of the resin component is decreased by copolymerization with another component or blending with another resin. According to the present invention, it is required that the melting point of the resin component is 230° C. or lower, preferably 225° C. or lower, and more preferably 220° C. or lower.

The present invention is further an oxygen absorber formed of an oxygen-absorbing resin composition including a resin component and a metal catalyst. The resin component has a heat of fusion of 35 J/g or lower.

The heat of fusion is generally used as an indicator of crystallinity of resin. MXD6 usually has a heat of fusion of approximately 50 J/g. A crystalline portion occupies a major part of the MXD6, however, an amorphous portion thereof can be increased by copolymerization with another component or blending with another resin. Moreover, crystallization of the amorphous portion in the MXD6 can be prevented to obtain a stable oxygen-absorbing ability.

The crystalline region of the resin component is decreased by copolymerization with another component or by blending with another resin. The heat of fusion can be measured by DSC described in conjunction of examples below. The heat of fusion is basically proportional to the size of the crystalline region.

In addition to the original crystalline region of the resin component, a crystalline region generated in the temperature-rising process of DSC measurement can be evaluated by means of the heat of fusion. When a resin material is used as an oxygen absorber for a long term, crystallization gradually proceeds. Then, the oxygen-absorbing ability is likely to deteriorate which can also be evaluated simultaneously with the evaluation of the crystalline region. Accordingly, it has been confirmed that the heat of fusion serves as an excellent indicator of the relation between the presence of the crystalline region and the oxygen-absorbing ability. According to the present invention, the heat of fusion of the resin component is required to be 35 J/g or lower, preferably 30 J/g or lower, and more preferably 25 J/g or lower.

Still more preferably, the glass transition temperature (Tg) measured in an atmosphere of 25° C. and 65% is 50° C. or lower. When Tg is 50° C. or lower, crystallization is less likely to occur so that the oxygen-absorbing efficiency can be enhanced.

The resin as discussed above can be produced by copolymerization of a monomer with a metaxylylene adipamide unit with other monomers with diamine unit, dicarboxylic unit or amino carboxylic unit, for example.

Examples of the diamine which can be used for copolymerization are aliphatic diamines such as ethylenediamine, trimethylenediamine, tetramethylenediamine, pentamethylenediamine, hexamethylenediamine, 2,2,4 (or 2,4,4)-trimethylhexamethylenediamine, heptamethylenediamine, octamethylenediamine, nonamethylenediamine, decamethylenediamine, undecamethylenediamine, dodecamethylenediamine, tridecamethylenediamine, hexadecamethylenediamine, and octadecamethylenediamine, alicyclic diamines such as cyclohexanediamine, 1,3-bis aminomethylcyclohexane, bis-(4,4'-aminocyclohexyl)methane, cyclohexanediamine, methylcyclohexanediamine, and bis-(4,4'-aminocyclohexyl)methane, and aromatic diamines such as paraxylylenediamine.

Examples of the dicarboxylic acid component are aliphatic dicarboxylic acids such as malonic acid, succinic acid, glutaric acid, pimelic acid, suberic acid, azelaic acid, sebacic acid, undecandioic acid, dodecandioic acid, tridecandioic acid, tetradecandioic acid, hexadecandioic acid, hexadecendioic acid, octadecandioic acid, octadecendioic acid, eicosandioic acid, eicocendioic acid, docosandioic acid and 3,2,4-trimethyl adipic acid, alicyclic dicarboxylic acid such as 1,4-cyclohexane dicarboxylic acid, and aromatic dicarboxylic acids such as terephthalic acid, isophthalic acid, phthalic acid, xylylene dicarboxylic acid, and naphthalene dicarboxylic acid. Moreover, a polyamide copolymer with lactams such as ε-caprolactam and laurolactam, or amino acids such as amino hexanoic acid and amino undecane acid may be used. Among them, copolymerization with nylon 6, 10 component is particularly preferable.

Alternatively, a polyester amido structure can be produced by combination of dicarboxylic acids with diol such as ethylene glycol, butanediol, hexanediol, octanediol, nonanediol, decanediol, diethylene glycol, triethylene glycol, polyethyleneglycol, and tetramethylene glycol.

Any copolymer structure having another structure may be used. Preferably, such structure includes, in order to exhibit an excellent oxygen-absorbing ability as discussed above, as a constitutional repeating unit, at least 50% by weight of a metaxylylene adipamide unit. If the amount of metaxylylene adipamide unit is less than 50% by weight, a satisfactory oxygen-absorbing speed may not be attained. The content of metaxylylene adipamide unit is preferably at least 60 wt % and more preferably 70 wt %.

Instead of the copolymers described above, a blend of an MXD6 polymer and another polymer may be employed. Another polyamide having a good affinity with the MXD6 polymer is suitable for the polymer to be blended.

Specific examples are aliphatic polyamides such as polycaprolactam (nylon 6), polylaurolactam (nylon 12), polyhexamethylene adipamide (nylon 6, 6), polyhexamethylene azelamide (nylon 6, 9), polyhexamethylene sebacamide (nylon 6, 10), and polyhexamethylene dodecanoamide (nylon 6, 12), alicyclic polyamide such as polyamide of 1,3-bis (aminomethyl) cyclohexane and aliphatic dicarboxylic acid, aromatic polyamides such as polyhexamethylene terephthalic amide (nylon 6, T), polyhexamethylene isophthalic amide (nylon 6, I) and polyphenylene phthalic amide, nylon 12-based elastomer, polyether ester amide, polyether polyamide and the like.

The object can be achieved by blending with another resin such as polyester, polyolefin and polyvinyl alcohol to the extent that the oxygen-absorbing property does not remarkably change.

Even with such blending, an excellent oxygen-absorbing ability is exhibited. Therefore, preferably at least 50% by weight of metaxylylene adipamide unit is contained as the constitutional repeating unit. If the content of the metaxylylene adipamide unit is less than 50 wt %, a sufficient oxygen-absorbing speed may not be attained. The content of the metaxylylene adipamide unit is more preferably at least 60 wt %, and still more preferably at least 70 wt %.

The copolymerization and polymer blending as described above allow a resultant resin component to have a melting point of 230° C. or lower, a heat of fusion of 35 J/g or lower, or Tg of 50° C. or lower. Preferably, when at least 50% by weight of the metaxylylene adipamide unit is contained, a material exhibiting an excellent oxygen-absorbing ability can be obtained.

According to the present invention, the metal catalyst is added to the polymer material or added thereto by being blended therewith. The amount of the added metal catalyst is not particularly restricted. Preferably, the metal catalyst from 0.001 wt % to 10 wt % with respect to the polymer is added. A smaller amount of the added catalyst does not provide improvements of the oxygen-absorbing ability. If a greater amount of the metal catalyst is added, no improvement in the oxygen-absorbing ability is achieved and a problem in terms of molding is likely to occur.

Such an oxygen-absorbing material can be used in the form of powder, particles or film or as one component of a molded product such as container.

In consideration of enhancement of the gas barrier property, a state of high crystallinity is desirable. When there is a strong demand for the gas barrier property of a component of a container such as a hollow container, tray, lid or the like with the purpose of a long-term preservation, preferably an oxygen-absorbing material of high crystallinity with Tg higher than 50° C., the melting point higher than 230° C., and the heat of fusion higher than 35 J/g is preferably used.

If the oxygen-absorbing ability is required, an oxygen-absorbing material of low crystallinity is preferably used as an oxygen-absorbing material in the form of cloth, non-woven fabric, powder, particles, film or sheet, or even as a component of a container such as hollow container, tray and lid.

In addition, an oxygen-absorbing material of high crystallinity and an oxygen-absorbing material of low crystallinity are preferably combined for use. Specifically, the oxygen-absorbing material of high crystallinity is used as a component of a container such as hollow container, tray or lid, and the oxygen-absorbing material of low crystallinity is put in the container. Alternatively, a bag, hollow container, tray, lid or the like may be formed as a laminate container having the oxygen-absorbing material of high crystallinity on the outside and the oxygen-absorbing material of low crystallinity on the inside.

EXAMPLES

Examples of the present invention are shown below. The present invention is not limited by the following examples and can apparently be practiced with appropriate modifications in the range which is suitable for the purposes described above and below in this description, any of such modifications being included in the technical scope of the present invention.

An amount of a basic group such as amino end group (AG) and an amount of a carboxyl end group (CEG) in an oxidizable polyamide resin containing metaxylylene diamine were prepared by adjusting the molarity of a diamine and that of a dicarboxylic acid to be equal to each other and thereafter adding a predetermined amount of additive for adjusting the amount of end group to accordingly polymerize them. A solid phase polymerization method was also employed to produce the resin. Table 1 shows monomer compositions.

SA: sebacic acid
PYA: pyromellitic acid anhydride
DA: dodecanoic acid

The relative viscosity of the polyamide resins shown in Table 1 was measured at 25° C. by using a 96% sulfuric acid solvent.

Respective amounts of the basic group and carboxyl end group were quantitated or determined by titration.

The amounts of the basic group such as amino group and of the carboxyl end group respectively may be determined by another rational analysis.

Quantitation of Amino Group

To a sample (weighing approximately 0.6 g), 450 ml of phenol/ethanol (capacity ratio 4:1) and 4 ml of aqueous solution of ethanol including hydrochloric acid (adjusted to 500 ml by adding distilled water to 100 ml of 1/10 N hydrochloric acid and 50 ml of ethanol) were added, and they were left for one night and then stirred for dissolution. One drop of methyl orange was added as an indicator to conduct titration by means of 1/50 N sodium hydroxide. For the titration, titrator GT-05 manufactured by Mitsubishi Chemical Corporation was used.

Quantitation of Carboxyl End Group

A sample of approximately 0.6 g set in a cell was weighed. 20 ml of benzyl alcohol was added to the cell containing the sample through which nitrogen gas was blown while they were stirred by a magnet stirrer for dissolution at 180±5° C. (for ten minutes). After dissolution by stirring, five drops of phenol phthalein as an indicator were added and they were stirred by the stirrer while titration was conducted by means of ethyl alcohol solution of 1/50 N potassium hydroxide.

A predetermined amount of a metal compound was blended with an oxidizable polyamide resin only or with a mixture of the oxidizable polyamide resin and a non-oxidizable thermoplastic resin, they were vacuum-dried at 100° C. (for one night), melt and kneaded by a twin screw extruder of 30 mm $\phi$ in a nitrogen atmosphere at 300° C.,

TABLE 1

| sample No. | diamine component (mol %) | dicarboxylic acid component (mol %) | end group amount adjusting agent (mmol/kg) | relative viscosity | AG mmol/kg | CEG mmol/kg |
|---|---|---|---|---|---|---|
| 1-(1) | MXD(100) | AA(100) | DA(100) | 2.22 | 8 | 68 |
| 1-(2) | MXD(100) | AA(100) | AA(40) | 2.33 | 3 | 88 |
| 1-(3) | MXD(100) | AA(100) | AA(20) | 2.45 | 21 | 65 |
| 1-(4) | MXD(100) | AA(100) | none | 2.38 | 66 | 62 |
| 2-(1) | MXD(80) PXD(20) | AA(100) | AA(20) | 2.33 | 15 | 74 |
| 3-(1) | MXD(95) PXD(5) | AA(100) | PYA(50) | 2.35 | 10 | 115 |
| 4-(1) | MXD(100) | AA(95) IPA(5) | AA(50) | 2.43 | 7 | 121 |
| 5-(1) | MXD(90), PXD(10) | AA(95) SA(5) | SA(100) | 2.32 | 3 | 181 |
| 5-(2) | MXD(90), PXD(10) | AA(95) SA(5) | none | 2.34 | 33 | 34 |

Monomers are represented by the following abbreviations in Table 1.
MXD: metaxylene diamine
PXD: paraxylene diamine
AA: adipic acid
IPA: isophthalic acid and shaped into a pellet after extruded and cooled. Resultant pellets are shown in Table 2

Examples 1–13

Twelve types of resins A-D and G-N and Q shown in Table 2 as well as PET resins with an intrinsic viscosity of 0.72 were used to form three-layer parisons each constituted of innermost and outermost layers made of PET and an intermediate layer made of any resin shown in Table 2, and then bottles were formed through blow molding. The parisons were formed according to a method of an embodiment described in Japanese Patent Publication No. (A) 57-123051. The resultant parisons were each 35 mm in the outer diameter, 140 mm in length and 5 mm in thickness. Respective layers have the thicknesses: outermost layer (PET)/intermediate layer (resin in Table 2)/innermost layer (PET)=2 mm/1 mm/2 mm. Following this, a biaxial stretch blow molding machine was used under the condition that the motion speed of a stretch rod was 22 cm/sec, the compressed gas pressure was 20 kg/cm$^2$, the stretch temperature was 130° C., and the stretch rate was 5.59 (=2.04 (axial direction)×2.74 (circumferential direction)) to perform blow molding in order to form each parison into a container. In the container thus produced (capacity 1543 cm$^3$), 1.5 l of an aqueous solution containing 100 ppm of oxygen-sensitive substance, namely L-ascorbic acid was poured. With the container stoppered, the solution was preserved in an environment of 40° C. and, after 10, 20 and 30 days, the amount of L-ascorbic acid of the solution in the container was measured.

Example 14

10 parts of resin O in Table 2 and 90 parts of PET-2 were blended for a cylindrical parison with a bottom (35 mm in outer diameter, 140 mm in length, 5 mm in thickness). A biaxial stretch blow molding machine was used under the condition that the motion speed of a stretch rod was 22 cm/sec, the compressed gas pressure was 20 kg/cm$^2$, the stretch temperature was 130° C., and the stretch rate was 5.59 (=2.04 (axial direction)×2.74 (circumferential direction)) to perform blow molding in order to form the parison into a container. In the container thus produced (capacity 1543 cm$^3$), 1.5 l of an aqueous solution containing 100 ppm of oxygen-sensitive substance, i.e., L-ascorbic acid, was poured. With the container stoppered, the solution was preserved in an environment of 40° C. and, after 10, 20 and 30 days, the amount of L-ascorbic acid of the solution in the container was measured.

Example 15

Resin B in Table 2 and a PET resin with an intrinsic viscosity of 0.72 were used to form a three-layer parison constituted of innermost and outermost layers made of PET and an intermediate layer made of resin B, and then a bottle was formed by blow molding. The parison was formed according to a method of an embodiment described in Japanese Patent Publication No. (A) 57-123051. The resultant parison had an outer diameter of 35 mm, a length of 140 mm and a thickness of 5 mm. The thicknesses of respective layers were: outermost layer (PET)/intermediate layer (resin in Table 2)/innermost layer (PET)=2.5 mm/0.5 mm/2 mm. Then, a biaxial stretch blow molding machine was used to form the parison into a container by a method similar to that of examples 1–13. In the container thus produced (capacity 1543 cm$^3$), 1.5 l of an aqueous solution containing 100 ppm of oxygen-sensitive substance, i.e., L-ascorbic acid, was poured. By a method similar to that of examples 1–13, the amount of L-ascorbic acid of the solution in the container after 10, 20 and 30 days was measured.

Example 16

Resin B and the PET resin with an intrinsic viscosity of 0.72 used for example 15 were used to form a five-layer parison. The parison thus formed had an outer diameter of 35 mm, a length of 140 mm and a thickness of 5 mm. The thicknesses of respective layers and the layer constitution were as follows (numerals in parentheses indicating thickness):

outermost layer=PET (1.5)/resin D (0.25)/PET (1.5)/resin D (0.25)/PET (1.5)=innermost layer.

A biaxial stretch blow molding machine was used under the condition that the motion speed of a stretch rod was 22 cm/sec, the compressed gas pressure was 20 kg/cm$^2$, the stretch temperature was 130° C., and the stretch rate was 5.59 (=2.04 (axial direction)×2.74 (circumferential direction)) to perform blow molding in order to form the parison into a container. In the container thus produced (capacity 1543 cm$^3$), 1.5 l of an aqueous solution containing 100 ppm of oxygen-sensitive substance, i.e., L-ascorbic acid, was poured. With the container stoppered, the solution was preserved in an environment of 40° C. and, after 10, 20 and 30 days, the amount of L-ascorbic acid of the solution in the container was measured.

Example 17

25% by weight of resin G in Table 2 and 75% by weight of nylon 6 resin (T814 manufactured by Toyo Boseki Kabushiki Kaisha) were mixed to produce a mixed resin which was extruded by an extruder of 30 mm φ at 295° C. and then stretched. Accordingly, a film with a thickness of 30 μm was produced. To this film, an LDPE film of 25 μm in thickness was bonded and thus they were formed into a laminate which was further heat-sealed by using a hot plate of 200° C. so as to form a bag of 100 mm×200 mm in size. The bag was filled with an aqueous solution containing 100 ppm of oxygen-sensitive substance, i.e. L-ascorbic acid and then sealed. The solution was accordingly preserved in an environment of 40° C. and, after 10, 20 and 30 days, the concentration of L-ascorbic acid of the solution in the bag was measured.

Example 18

The nylon layer of the laminated film of example 17 was laminated with an aluminum foil of 7 μm in thickness with an adhesive of ester urethane string to be heat-sealed by a hot plate of 200° C. A bag of 100 mm×200 mm in size was thus formed. The bag was filled with an aqueous solution containing 100 ppm of oxygen-sensitive substance, L-ascorbic acid, and then sealed. The solution was preserved in an environment of 40° C. and, after 10, 20 and 30 days, the concentration of L-ascorbic acid of the solution in the bag was measured.

Example 19

By co-injection molding of resin No. O in Table 2 and a polyester resin ([η]=1.02), a screw cap was formed having an outer layer made of polyester and an inner layer made of resin No. O and having an inner diameter of 32 mm and a height of 20 mm. A PET bottle with a capacity of 1 l was filled with an aqueous solution containing 100 ppm of oxygen-sensitive substance, L-ascorbic acid. With the bottle sealed, the solution was preserved in an environment of 40° C. and, after 10, 20 and 30 days, the concentration of L-ascorbic acid of the solution in the bottle was measured.

Example 20

By coextrusion of resin O in Table 2, LDPE and ethylene-vinyl acetate copolymer as Admer, a sheet of 900 μm in thickness was formed that was constituted of five layers: LDPE (350 μm)/Admer (50 μm)/resin O (100 μm)/Admer (50 μm)/LDPE (350 μm). A part of the sheet that was 32 mm in diameter was cut out from the sheet and then used as a liner of an aluminum screw cap with an inner diameter of 32 mm and a height of 20 mm. A glass bottle with a capacity of 500 ml was filled with an aqueous solution containing 100 ppm of oxygen-sensitive substance, L-ascorbic acid, and then sealed. The head space was 10 ml. The solution was preserved in an environment of 40° C., and after 10, 20 and 30 days, the concentration of L-ascorbic acid of the solution in the bottle was measured.

Comparative Examples 1–4

Resin E, resin F and resin P shown in Table 2 and a PET resin with an intrinsic viscosity of 0.72 were used to form three-layer parisons having innermost and outermost layers made of PET and intermediate layers of resin E, resin F and resin P respectively. Bottles were thereafter formed by blow molding. The parisons were formed according to a method of an embodiment described in Japanese Patent Publication No. (A) 57-123051. Resultant parisons were each 35 mm in outer diameter, 140 mm in length and 5 mm in thickness. The thicknesses of respective layers were: outermost layer (PET)/intermediate layer (resin in Table 2)/innermost layer (PET)=2 mm/1 mm/2 mm. A biaxial stretch blow molding machine was then used under the condition that the motion speed of a stretch rod was 22 cm/sec, the compressed gas pressure was 20 kg/cm$^2$, the stretch temperature was 130° C., and the stretch rate was 5.59 (=2.04 (axial direction)× 2.74 (circumferential direction)) to perform blow molding in order to form each parison into a container. In the container thus produced (capacity 1543 cm$^3$), 1.5 l of an aqueous solution containing 100 ppm of oxygen-sensitive substance, i.e., L-ascorbic acid, was poured. With the container stoppered, the solution was preserved in an environment of 40° C. and, after 10, 20 and 30 days, the amount of L-ascorbic acid of the solution in the container was measured.

Comparative Example 4

5 parts of resin No. F in Table 2 and 95 parts of PET-2 were blended for a cylindrical parison with a bottom (35 mm in outer diameter, 140 mm in length, 5 mm in thickness). A biaxial stretch blow molding machine was used under the condition that the motion speed of a stretch rod was 22 cm/sec, the compressed gas pressure was 20 kg/cm$^2$, the stretch temperature was 130° C., and the stretch rate was 5.59 (=2.04 (axial direction)×2.74 (circumferential direction)) to perform blow molding in order to form the parison into a container. In the container thus produced (capacity 1543 cm$^3$), 1.5 l of an aqueous solution containing 100 ppm of oxygen-sensitive substance, i.e., L-ascorbic acid, was poured. With the container stoppered, the solution was preserved in an environment of 40° C. and, after 10, 20 and 30 days, the amount of L-ascorbic acid of the solution in the container was measured.

Comparative Example 5

Except that resin No. F instead of resin No. G in Table 2 was used, a bag was formed by exactly the same method as that of example 17. The bag was filled with an aqueous solution containing 100 ppm of oxygen-sensitive substance, L-ascorbic acid, and then sealed. The solution was preserved in an environment of 40° C. and, after 10, 20 and 30 days, the concentration of L-ascorbic acid of the solution in the bag was measured.

Comparative Example 6

Except that resin No. F in Table 2 was used instead of resin No. G used for example 18, a bag with aluminum foil lamination was formed by exactly the same method as that of example 18. The bag was filled with an aqueous solution containing 100 ppm of oxygen-sensitive substance, L-ascorbic acid, and then sealed. The solution was preserved in an environment of 40° C. and, after 10, 20 and 30 days, the concentration of L-ascorbic acid of the solution in the bag was measured.

Comparative Example 7

Except that resin No. S in Table 2 was used instead of resin No. O, a screw cap was formed by exactly the same method as that of example 19 through co-injection molding with a polyester resin ([η]=1.02). The screw cap was constituted of an outer layer made of polyester and an inner layer made of resin S and had an inner diameter of 32 mm and a height of 20 mm. A PET bottle with a capacity of 1 l was filled with an aqueous solution containing 100 ppm of oxygen-sensitive substance, L-ascorbic acid. With the bottle sealed, the solution was preserved in an environment of 40° C. and, after 10, 20 and 30 days, the concentration of L-ascorbic acid of the solution in the bottle was measured.

Comparative Example 8

Resin No. S in Table 2 was used instead of resin No. O, and, by coextrusion with LDPE and ethylene-vinyl acetate copolymer as Admer, a sheet of 900 μm in thickness was formed that was constituted of five layers: LDPE (350 μm)/Admer (50 μm)/resin S (100 μm)/Admer (50 μm)/LDPE (350 μm), similarly to example 20. A part of the sheet that was 32 mm in diameter was cut out from the sheet and then used as a liner of an aluminum screw cap with an inner diameter of 32 mm and a height of 20 mm. A glass bottle with a capacity of 500 ml was filled with an aqueous solution containing 100 ppm of oxygen-sensitive substance, L-ascorbic acid, and then sealed. The solution was preserved in an environment of 40° C., and, after 10, 20 and 30 days, the concentration of L-ascorbic acid of the solution in the bottle was measured.

The intrinsic viscosity [η] of the PET used for the present invention was measured by using a mixed solvent of phenol/tetrachloroethane=6/4 (weight ratio) at 30° C.

The abbreviations used in Table 2 are as follows.

PET1: polyethylene terephthalate ([η]=0.72)
PET2: polyethylene terephthalate ([η]=1.02)
Evar: ethylene-vinyl alcohol copolymer (manufactured by Kuraray Co., Ltd., "Evar E")
Ny6: "T-830" manufactured by Toyo Boseki Kabushiki Kaisha
Barex 210: polymer with high nitrile content manufactured by Vistron Corporation

TABLE 2

| resin No. | polymer of Table 1 (wt %) | | non-oxidizable resin (wt %) | metal catalyst compound (metal content:ppm) |
|---|---|---|---|---|
| A | 1-(1) | (100) | — | cobalt acetate (Co:500) |
| B | 1-(1) | (100) | — | cobalt acetate (Co:500) manganese acetate (Mn:100) |
| C | 1-(1) | (100) | — | cobalt acetate (Co:1000) |
| D | 1-(2) | (100) | — | cobalt benzoate (Co:500) |
| E | 1-(3) | (100) | — | cobalt acetate (Co:450) |
| F | 1-(4) | (100) | — | cobalt octanoate (Co:500) |
| G | 2-(1) | (100) | — | cobalt acetate (Co:480) |
| H | 2-(1) | (5) | PET-1 (95) | cobalt acetate (Co:500) |
| I | 2-(1) | (20) | PET-2 (80) | cobalt acetate (Co:600) |
| J | 3-(1) | (100) | — | cobalt Siccatol (Co:500) |
| K | 3-(1) | (90) | Evar (10) | cobalt monooctyl phosphate/ cobalt acetate = 1/1 (Co:500) |

TABLE 2-continued

| resin No. | polymer of Table 1 (wt %) | non-oxidizable resin (wt %) | metal catalyst compound (metal content:ppm) |
|---|---|---|---|
| L | 3-(1) (90) | Barex210 (10) | cobalt acetate/polyacrylic acid = 5/1 (Co:500 ppm) |
| M | 3-(1) (80) | Ny6 (10) | cobalt acetate (Co:450) |
| N | 4-(1) (100) | — | cobalt acetate (Co:500) |
| O | 5-(1) (100) | — | cobalt acetate/BTCA = 1/1 (Co:5000) |
| P | 5-(2) (100) | — | cobalt acetate (Co:500) |
| Q | 1-(1) (100) | — | cobalt acetate (Co:200) |
| R | 1-(1) (100) | — | cobalt acetate (Co:150) |
| S | 1-(4) (100) | — | cobalt acetate/BTCA = 1/1 (Co:5000) |

Table 3 shows results of examples 1–13 and comparative examples 1–4. The results of examples 1–13 exhibit the favorable residue ratio of at least 70% of L-ascorbic acid even after 30 days in the environment of 40° C.

TABLE 3

| | content ratio of oxidizable resin (wt %) | AG, CEG amount of oxidizable polyamide | | metal catalyst amount in container (ppm) | remaining L-ascorbic acid (%) | | |
|---|---|---|---|---|---|---|---|
| | | AG mmol/kg | CEG mmol/kg | | after 10 days | after 20 days | after 30 days |
| e. 1*[1] | A(18.4) | 8 | 68 | Co:99 | 95 | 94 | 92 |
| e. 2 | B(18.4) | 8 | 68 | Co/Mn = 98/18 | 96 | 95 | 94 |
| e. 3 | C(18.3) | 8 | 68 | Co:185 | 92 | 89 | 87 |
| e. 4 | D(18.2) | 3 | 88 | Co:99 | 98 | 96 | 94 |
| e. 5 | G(18.2) | 15 | 74 | Co:87 | 85 | 81 | 79 |
| e. 6 | H(1.2) | 15 | 74 | Co:99 | 80 | 76 | 71 |
| e. 7 | I(3.8) | 15 | 74 | Co:118 | 90 | 87 | 85 |
| e. 8 | J(18.4) | 10 | 115 | Co:100 | 98 | 96 | 94 |
| e. 9 | K(16.5) | 10 | 115 | Co:98 | 96 | 94 | 92 |
| e. 10 | L(16.4) | 10 | 115 | Co:99 | 95 | 94 | 92 |
| e. 11 | M(16.5) | 10 | 115 | Co:87 | 94 | 93 | 92 |
| e. 12 | N(18.1) | 7 | 121 | Co:99 | 97 | 95 | 93 |
| e. 13 | Q(18.4) | 8 | 68 | Co:36 | 84 | 80 | 75 |
| e. 14 | O(18.4) | 3 | 181 | Co:500 | 98 | 96 | 94 |
| e. 15 | D(9.1) | 3 | 88 | Co:45 | 92 | 90 | 87 |
| e. 16 | D(9.1) | 3 | 88 | Co:45 | 98 | 96 | 94 |
| c.e. 1*[2] | E(18.4) | 21 | 65 | Co:82 | 70 | 68 | 66 |
| c.e. 2 | F(18.4) | 66 | 62 | Co:99 | 66 | 64 | 63 |
| c.e. 3 | P(18.4) | 33 | 34 | Co:99 | 68 | 66 | 64 |
| c.e. 4 | F(5.0) | 66 | 62 | Co:25 | 62 | 60 | 56 |

*[1]e.: example
*[2]c.e.: comparative example

Table 4 shows results of examples 17–20 and comparative examples 5–8. The results of examples 17–20 exhibit the superior residue ratio of L-ascorbic acid even after 30 days in the environment of 40° C. compared with the comparative examples.

TABLE 4

| | oxidiz- able resin | AG, CEG amount of oxidizable polyamide | | remaining L-ascorbic acid (%) | | |
|---|---|---|---|---|---|---|
| | | AG mmol/kg | CEG mmol/kg | after 10 days | after 20 days | after 30 days |
| e. 17*[1] | G | 15 | 74 | 88 | 82 | 80 |
| e. 18 | G | 15 | 74 | 96 | 95 | 94 |
| e. 19 | O | 7 | 121 | 85 | 74 | 68 |
| e. 20 | O | 3 | 88 | 94 | 92 | 90 |
| c.e. 5*[2] | F | 66 | 62 | 54 | 41 | 25 |
| c.e. 6 | F | 66 | 62 | 72 | 60 | 54 |
| c.e. 7 | S | 66 | 62 | 64 | 32 | 12 |
| c.e. 8 | S | 66 | 62 | 76 | 62 | 55 |

*[1]e.: example
*[2]c.e.: comparative example

Quantisation of the L-ascorbic acid was conducted under the following conditions.

Machine: high-performance liquid chromatography machine manufactured by Waters Corporation (Waters 625LC system)

Detection: UV 245 nm
Column: Shodex PS80H
Moving Phase: 0.1 vol % $HClO_4$ aqueous solution Table 5 shows the metal content in a transition metal compound contained in an oxidizable polyamide resin layer of a molded product such as multi-layer container.

TABLE 5

| example/ comparative example | resin No. | Co content | another metal content |
|---|---|---|---|
| e. 1*[1] | A | 500 | — |
| e. 2 | B | 500 | Mn:100 |
| e. 3 | C | 1000 | — |
| e. 4 | D | 500 | — |
| e. 5 | G | 450 | — |
| e. 6 | H | 500 | — |
| e. 7 | I | 600 | — |
| e. 8 | J | 500 | — |
| e. 9 | K | 500 | — |
| e. 10 | L | 500 | — |

TABLE 5-continued

| example/<br>comparative<br>example | resin<br>No. | Co content | another metal<br>content |
|---|---|---|---|
| e. 11 | M | 450 | — |
| e. 12 | N | 500 | — |
| e. 13 | Q | 200 | — |
| e. 14 | O | 5000 | — |
| e. 15 | D | 500 | — |
| e. 16 | D | 500 | — |
| e. 17 | G | 450 | — |
| e. 18 | G | 450 | — |
| e. 19 | O | 5000 | — |
| e. 20 | O | 5000 | — |
| c.e. 1*[2] | E | 450 | — |
| c.e. 2 | F | 500 | — |
| c.e. 3 | P | 500 | — |
| c.e. 4 | F | 500 | — |
| c.e. 5 | F | 500 | — |
| c.e. 6 | F | 500 | — |
| c.e. 7 | S | 5000 | — |
| c.e. 8 | S | 5000 | — |

*[1]e.: example
*[2]c.e.: comparative example

Examples are now shown concerning oxygen-absorbing materials with low crystallinity as well as molded products using them therein.

DSC was used to measure the melting point, Tg and heat of fusion of resin in a 65% RH atmosphere at 25° C. by putting 5 mg of resin in an aluminum pan, putting an aluminum lid thereon, and crimping it, and, by means of Perkin-Elmer DSC7, measurements were taken at a temperature rise rate of 20° C./min.

The oxygen-absorbing rate was measured by placing a measurement film of 1 cm square in an opened glass container, soaking the film in a water bath set at 50° C. and leaving it for 72 hours. A sample was partially dissolved in deuterated formic acid/deuterated chloroform (4/1). At 50° C., a Varian Unity-500 NMR spectrometer was used to carry out H-NMR measurement. The amount of absorbed oxygen was quantitated based on the amount of signal decrease of methylene proton in a metaxylylene diamine unit. (The signal amount of methylene proton in the metaxylylene diamine unit was determined by the ratio of methylene signal intensity in the metaxylylene diamine unit appearing at 4–4.5 ppm with respect to the signal intensity of proton on an aromatic ring in the metaxylylene diamine unit appearing at 6.8 ppm–8 ppm.) A greater amount of decrease indicates a superior oxygen-absorbing ability.

Example 21

Metaxylylene diamine, adipic acid and sebacic acid with a mole ratio of 100:90:10 were synthesized into copolymer polyamide. The melting point measured by DSC was 219° C. With respect to an acid component of the resultant copolymer polyamide, 1 mol % of cobalt acetate was mixed. By an extruder set at 270° C., the polyamide was formed into a pellet (pellet T). The pellet was formed into a film of approximately 40 μm in thickness by a heat press machine set at 270° C. The amount of methylene signal decrease measured in the oxygen-absorbing rate measurement conducted by the method described above was 17%.

Example 22

Metaxylylene diamine, decamethylene diamine and adipic acid at a mole ratio of 90:10:100 were synthesized into copolymer polyamide which was evaluated as done for example 1 (pellet U). The melting point was 217° C. and the methylene signal decrease amount in the oxygen-absorbing rate measurement was 15%.

Example 23

Commercially available MXD6 (T600 manufactured by Toyo Boseki Kabushiki Kaisha) was mixed with metaxylylene diamine, adipic acid and sebacic acid at a mole ratio of 100:50:50 synthesized into copolymer polyamide, at a weight ratio of 2:1, with which 1 mol % of cobalt acetate was mixed. The mixture was formed into a pellet (pellet V) by an extruder set at 270° C. The pellet was further formed into a film of approximately 40 μm in thickness by a heat press machine set at 270° C. Evaluation similar to that of example 1 was made and no distinct melting point was confirmed. The amount of methylene signal decrease measured in the oxygen-absorbing rate measurement was 15%.

Example 24

Metaxylylene diamine, adipic acid and sebacic acid at a mole ratio of 100:80:20 were synthesized into copolymer polyamide. The heat of fusion at the peak of melting point was 27 J/g which was measured by DSC. The resultant copolymer polyamide was mixed with 1 mol % of cobalt acetate and then formed into a pellet (pellet W) by an extruder set at 270° C. The pellet was then formed into a film of approximately 40 μm in thickness by a heat press machine set at 270° C. The amount of methylene signal decrease determined in the oxygen-absorbing rate measurement performed by the method described above was 17%.

Example 25

Metaxylylene diamine, decamethylene diamine and adipic acid at a mole ratio of 80:20:100 were synthesized into copolymer polyamide to be evaluated as done for example 1 (pellet X). The heat of fusion measured by DSC was 25 J/g and the amount of methylene signal decrease determined in the oxygen-absorbing rate measurement was 16%.

TABLE 6

| | | amount of remaining L-ascorbic acid (%) | | |
|---|---|---|---|---|
| | resin pellet | after 10 days | after 20 days | after 30 days |
| example 26 | pellet T | 96 | 94 | 94 |
| example 27 | pellet U | 96 | 96 | 95 |
| example 28 | pellet V | 94 | 92 | 92 |

Examples 26–28

The amount of L-ascorbic acid was measured as done for example 1 except that resin pellets described in conjunction with examples 21, 22 and 23 were used for the intermediate layer. Results are shown in Table 6.

EFFECT OF THE INVENTION

The oxygen-absorbing materials according to the present invention exhibit a remarkably high oxygen-absorbing ability. Moreover, when the oxygen-absorbing materials are used for a molded product such as container, the excellent gas-barrier and oxygen-absorbing properties of the materials make it possible to absorb oxygen from contents and further to block out oxygen so that the contents can be maintained in an oxygen-free state for a long period of time. In addition, the molded product is made of resin and accordingly, the molded product can easily be formed and can be of lightweight. The molded product having the characteristics above makes a considerable contribution to industrial development, as a container or the like for long-term storage of oxygen-sensitive substances.

What is claimed is:

1. An oxygen-absorbing material including a transition metal compound and at least one thermoplastic resin, said at least one thermoplastic resin being an oxidizable resin containing an amino group with an amino group content of no more than 20 mmol/kg.

2. An oxygen-absorbing material comprising a resin composition including a resin component and metal catalyst, said resin component including a polyamide having a xylylene diamine structure as an oxidizable resin, wherein the resin has a melting point of no more than 230° C.

3. An oxygen-absorbing material comprising a resin component and a metal catalyst, said resin component including a polyamide having a xylylene diamine structure as an oxidizable resin with a heat of fusion of no more than 35 J/g.

4. An oxygen-absorbing material comprising a resin component and a metal catalyst, said resin component including a polyamide having a xylylene diamine structure as an oxidizable resin with a glass transition temperature of no more than 50° C. measured in an atmosphere of 25° C. and 65% relative humidity.

5. The oxygen-absorbing material according to claim 1, wherein said transition metal compound is mainly included in an oxidizable resin layer with a metal content of at least 200 ppm.

6. The oxygen-absorbing material according to claim 1, wherein said transition metal of said transition metal compound includes a metal selected from the group consisting of Co, Cu, Mn, and Fe.

7. The oxygen-absorbing material according to claim 1, wherein said oxidizable resin has a structural unit including a methylene group bonded to an aromatic ring, and said methylene group is further bonded to an element other than hydrogen and carbon.

8. The oxygen-absorbing material according to claim 1, wherein said oxidizable resin is polyamide.

9. The oxygen-absorbing material according to claim 8, wherein a diamine component of said polyamide is xylylene diamine.

10. The oxygen-absorbing material according to claim 2, wherein said transition metal compound is mainly included in an oxidizable resin layer with a metal content of at least 200 ppm.

11. The oxygen-absorbing material according to claim 3, wherein said transition metal compound is mainly included in an oxidizable resin layer with a metal content of at least 200 ppm.

12. The oxygen-absorbing material according to claim 4, wherein said transition metal compound is mainly included in an oxidizable resin layer with a metal content of at least 220 ppm.

13. The oxygen-absorbing material according to claim 2, wherein said transition metal of said transition metal compound includes a metal selected from the group consisting of Co, Cu, Mn, and Fe.

14. The oxygen-absorbing material according to claim 3, wherein said transition metal of said transition metal compound includes a metal selected from the group consisting of Co, Cu, Mn, and Fe.

15. The oxygen-absorbing material according to claim 4, wherein said transition metal of said transition metal compound includes a metal selected from the group consisting of Co, Cu, Mn, and Fe.

16. The oxygen-absorbing material according to claim 2, wherein said oxidizable resin has a structural unit including a methylene group bonded to an aromatic ring, and said methylene group is further bonded to an element other than hydrogen and carbon.

17. The oxygen-absorbing material according to claim 3, wherein said oxidizable resin has a structural unit including a methylene group bonded to an aromatic ring, and said methylene group is further bonded to an element other than hydrogen and carbon.

18. The oxygen-absorbing material according to claim 4, wherein said oxidizable resin has a structural unit including a methylene group bonded to an aromatic ring, and said methylene group is further bonded to an element other than hydrogen and carbon.

* * * * *